Patented Apr. 10, 1945

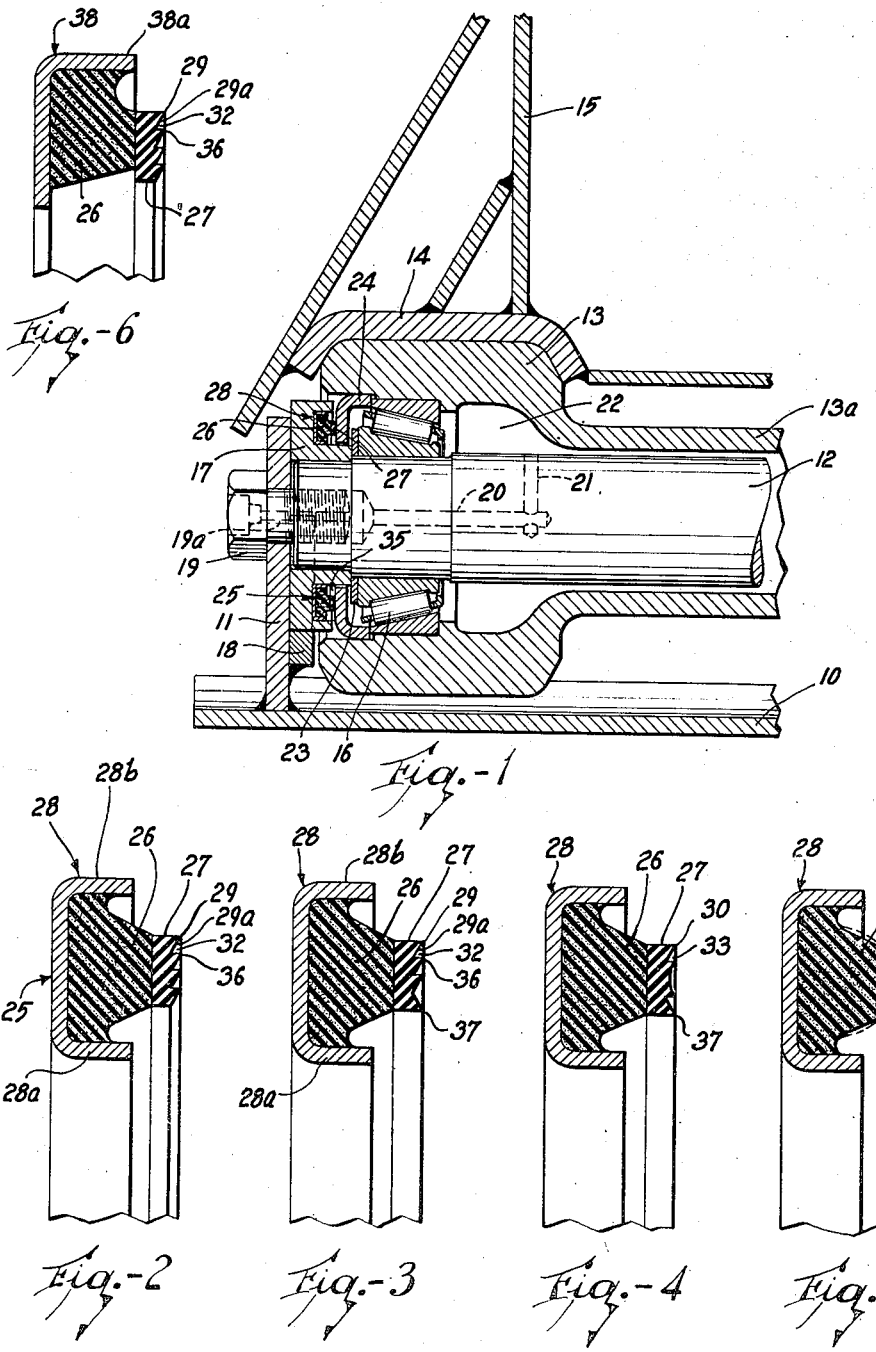

2,373,443

UNITED STATES PATENT OFFICE 2,373,443

SEALING MEANS

Raymond Q. Armington, Shaker Heights, Ohio, assignor to The Euclid Road Machinery Co., Euclid Ohio, a corporation of Ohio Application July 5, 1943, Serial No. 493,528

4 Claims. (Cl. 286—7)

This invention relates to improvements in sealing means adapted to prevent dirt from working across a surface into a bearing, oil reservoir or the like, or adapted to prevent leakage of lubricant, or in other similar locations where sealing means of this type is used.

An object of the present invention is to provide a seal having long life with low frictional resistance or drag and other advantages which will be more fully pointed out in the accompanying specification.

In the drawings,

Fig. 1 is a fragmental sectional view through a portion of an endless crawler track showing a roller supported by a track shoe and a crawler frame in turn supported on the roller;

Fig. 2 is a greatly enlarged view of the sealing means shown in Fig. 1;

Figs. 3, 4 and 5 show three different modifications of the sealing means; while

Fig. 6 shows a modified form of mounting for the sealing means.

My improved sealing means has many applications in industry, as will occur to those familiar with such problems, although I have chosen to illustrate the same in connection with an endless crawler track like that disclosed in the copending application of Stewart F. Armington, Serial No. 493,555, filed July 5, 1943. Referring to Fig. 1, in such a device a series of track shoes 10 is connected together by means of link pins to form an endless track. Each track shoe has a pair of upstanding side walls 11 (one only of which is shown here) in which is mounted a shaft 12 which supports a roller 13. In the present instance there are two roller portions 13 (one only of which is shown) connected together by a hollow tube portion 13a. The rollers in turn engage against a track 14 which forms part of a main frame 15. These parts are all more clearly described in the above mentioned copending application and further explanation is not necessary here for the understanding of my invention.

Between the shaft 12 and the roller 13 I have shown a bearing 16 which is illustrated as of the roller type. A collar 17 has a press fit on the reduced end of shaft 12. This collar rests upon a saddle 18 which is welded to the shoe side wall 11 and helps to support a major portion of the shaft load. The shaft is held in position by a stud bolt 19 which passes through an opening in the shoe wall 11 and is threaded into the shaft 12. This bolt is hollow for the purpose of supplying lubricant through an alemite fitting or the like. The hollow opening 19a in the bolt communicates with the lubricating passages 20 and 21 in the shaft so that lubricant may be fed to the chamber 22 between the roller and the shaft. A washer 23 is of a selected thickness to properly hold the bearing 16 in place by means of the collar 17. A hardened steel washer 24 is fitted tightly in the open end of the roller 13 so as to substantially close the lubricant-holding space around the bearing 16 and it is this washer which cooperates with my novel sealing means.

As shown in Figs. 1 and 2, my improved sealing means 25 comprises an annular ring of compressible sealing material preferably, although not necessarily, of two-piece construction. As best seen in Fig. 2 I have shown a base strip 26 of an easily compressible spongy material such as sponge Neoprene. To the wearing face of the strip 26 I attach by suitable adhesive a face strip 27 of abrasion-resisting material having some flexibility and resilience such as Hycar. This face strip is relatively hard and incompressible compared to the base strip. The entire seal is mounted in a ring-stamping 28 here shown channel form in section, although other forms may be used as will later appear. When the sealing ring is in operative position as shown in Fig. 1, preferably the dimension of the sealing material parallel to the axis of shaft 12 is approximately $\frac{1}{16}$ inch less than when the sealing material is in its unstressed condition. In other words, in inserting the sealing strip into operative position it is compressed approximately $\frac{1}{16}$ of an inch parallel to shaft 12. The face strip 27 then engages the washer 24 with sufficient compression to form a seal preventing the entrance of dirt radially inwardly toward shaft 12 and preventing the escape of lubricant radially outwardly from shaft 12. It will be understood by those skilled in this art that the lubricant fills not only the chamber 22 but all of the space around the bearing 16 outwardly to the washer 24 and will work through the small annular space between washer 24 and collar 17 into the slight annular chamber radially inwardly from the sealing means 26, 27.

Sealing means has been used before this in the exact location illustrated in Fig. 1. Such sealing means, however, has provided a flat surface between the washer 24 and the strip of sealing material. With this construction dirt has worked under the radially outermost portion of the seal and has gradually worked its way inwardly so as to quickly wear away the sealing material and destroy the value of the seal. One of the objects of the present invention is to provide a sealing lip engaging the washer 24 at the radially outermost portion of the seal so as to prevent dirt working radially inwardly. In all forms of my invention here illustrated there is such a lip at the radially outermost portion of the seal although I have shown various modified constructions inwardly from such a point. This lip is marked 29 in Figs. 2, 3 and 6, is shown at 30 in Fig. 4, and at 31 in Fig. 5. It results from this construction that the seal pressure is concentrated at this radially outermost lip, which aids in keeping the dirt out and which has other advantages, as will presently appear. Radially inwardly from the lip there is a recess in the face of the seal which is shown at 32 in Figs. 2, 3 and 6, at 33 in Fig. 4, and at 34 in Fig. 5. This gives a relief back of the sharp lip, or downstream therefrom with regard to dirt movement. Thus the lip is pointed outwardly against the tendency of the dirt to enter and aids in expelling the dirt. This concavity back of the lip is generally filled with a lubricant which aids in retaining the dirt and reduces the seal drag against the washer 24.

It will be noted that the downstream face of the lip 29 at 29a is inclined outwardly toward the sharp edge of the lip. This aids in the flow of lubricant outwardly when the bearing is flushed with fresh lubricant. In such a case the lubricant is forced through the hollow bolt 19 through the various passageways shown, passing through chamber 22, bearing 16 and eventually through chamber 35 and radially outwardly between the sealing strip and the washer 24. This flushes out any dirt which may have entered the recess 32. A sealing strip formed as shown in Fig. 2 with one or more lips of saw-tooth form pointing radially outwardly lends itself very readily to this type of construction where it is desired to flush the seal by means of a lubricant under pressure.

In the form of sealing face strip shown in Figs. 1, 2 and 6, a plurality of substantially parallel sealing lips is provided for the purpose of lengthening the life of the sealing means. If dirt finally wears away the lip 29, then the lip 36 is available to perform the same function originally performed by lip 29. Several of these lips may be provided as shown in Figs. 1, 2 and 6 so as to repeat this performance a number of times.

The inner leg 28a of the stamping 28 serves to mount the sealing means on the collar 17. The outer leg 28b aids in protecting the sponge Neoprene against the abrasive action of the dirt. The sponge Neoprene may be pressed into the stamping 28 and may also be sealed thereto by means of adhesive material if desired. The construction of my improved sealing means is such that it may form part of the shaft 12 as shown in Fig. 1 or it may form part of the outer housing or roller 13 if desired. In other words, it does not matter on which of the two members the sealing means is mounted so long as the principles herein set forth are utilized.

Where the seal is used between relatively rotatable parts such as the members 12 and 13 here illustrated, the seal is preferably formed as shown in Fig. 1, so that the centrifugal action of the rotating part tends to throw the dirt away from the sealing lip. Thus the seal and centrifugal force cooperate to keep the dirt from entering the protected space.

In the modifications shown in Figs. 3, 4 and 5, a lip 37 is formed at the radially innermost edge of the sealing means for the purpose of better holding the lubricant in the protected space. The principle here involved is the same as that previously described for the exclusion of dirt. In other words, the lip 37 is directed inwardly against the possible flow of lubricant outwardly. Here again, when the sealing means is compressed against the washer 24 the pressure of the seal will be concentrated at the lip 37 and aid in the retaining of the lubricant.

In Fig. 4 there is a balanced construction with two lips pointing radially inwardly and two directed radially outwardly, giving a multiple seal in both directions.

In Fig. 5 there is a very simple seal having one lip at the radially outermost point and another lip at the radially innermost point. The compressed position of the sealing face has been indicated here by dot-dash lines.

The seals shown in Figs. 3, 4 and 5 would not be so desirable in a position as shown in Fig. 1 where it was desirable or necessary to flush the lubricant outwardly past the sealing means, because the lip 37 would resist such lubricant flow. However, these seals would be advantageous where it was desired merely to retain oil in a reservoir, such as a transmission case.

A modified form of retaining ring is shown in Fig. 6. Here the stamping 38 is of L-shaped section, which serves to hold the sealing strip and which provides an outer leg 38a protecting the seal against the abrasive action of dirt.

It will be noted that whether the sealing strip is attached to the stationary or to the moving member, in any case the sealing material and the mounting means in which it is held are relatively immovable and there is no abrasive action of dirt between strip 26 and the stamping 28.

While I have shown herein a two part sealing strip, I do not desire to limit my invention to this specific construction. I find it advantageous to choose the base strip 26 for compressibility and the face strip for its abrasion resisting qualities. However, the entire strip might be constructed of one type of material having both of these qualities or representing a compromise between them.

The channel shape holding ring 28 has several advantages over the L-shape ring 38 of Fig. 6. The sponge Neoprene base strip 26 has admirable qualities of resilience and compressibility but is easily attacked and worn away by water and dirt. The channel shape ring 28 protects the sponge from abrasion, gives more bonding area between the base strip and the holding ring, and gives greater stability to the seal generally.

What I claim is:

1. In combination with a shaft member and a body member surrounding it wherein one of said members is rotatable relative to the other, one of said members having a substantially flat radially extending surface, sealing means on the other of said members comprising deformable sealing material having a face presented toward said surface, and said material having a circumferentially extending sharp lip facing radially outwardly and engaging said surface to resist movement of dirt radially inwardly.

2. In combination with a shaft member and a body member surrounding it wherein one of said members is rotatable relative to the other, one of said members having a substantially flat radially extending surface, sealing means on the other of said members comprising deformable sealing material having a face presented toward said surface, and said material having a circumferentially extending sharp lip facing radially inwardly and engaging said surface to resist movement of lubricant outwardly.

3. In combination with a shaft member and a body member surrounding it wherein one of said members is rotatable relative to the other, one of said members having a substantially flat radially extending surface, sealing means on the other of said members comprising deformable sealing material having a face presented toward said surface, said material in engagement with said surface having a plurality of substantially parallel annular sharp lips facing radially outwardly and also having a plurality of substantially parallel annuar sharp lips facing radially inwardly.

4. In combination with a shaft member and a body member surrounding it wherein one of said members is rotatable relative to the other, one of said members having a substantially flat radially extending surface, sealing means on the other of said members comprising deformable sealing material having a face presented toward said surface, and said material having an annular sharp lip in sealing engagement with said surface.

RAYMOND Q. ARMINGTON.